(12) United States Patent
Kato et al.

(10) Patent No.: US 10,395,407 B2
(45) Date of Patent: *Aug. 27, 2019

(54) IMAGE PROCESSING APPARATUS AND IMAGE PROCESSING METHOD

(71) Applicant: CANON KABUSHIKI KAISHA, Tokyo (JP)

(72) Inventors: Minako Kato, Kawasaki (JP); Kiyoshi Umeda, Kawasaki (JP); Hiroyuki Sakai, Chigasaki (JP); Hiroyasu Kunieda, Yokohama (JP); Yusuke Hashii, Tokyo (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 91 days.

This patent is subject to a terminal disclaimer.

(21) Appl. No.: 15/673,161

(22) Filed: Aug. 9, 2017

(65) Prior Publication Data

US 2017/0337721 A1  Nov. 23, 2017

Related U.S. Application Data

(63) Continuation of application No. 15/162,322, filed on May 23, 2016, now Pat. No. 9,761,031, which is a continuation of application No. 14/668,792, filed on Mar. 25, 2015, now Pat. No. 9,373,031, which is a continuation of application No. 13/934,400, filed on Jul. 3, 2013, now Pat. No. 9,014,487.

(30) Foreign Application Priority Data

Jul. 9, 2012  (JP) .................................. 2012-153670

(51) Int. Cl.
*G06T 11/60* (2006.01)
*G06K 9/62* (2006.01)
*G06K 9/00* (2006.01)

(52) U.S. Cl.
CPC .......... *G06T 11/60* (2013.01); *G06K 9/00677* (2013.01); *G06K 9/00684* (2013.01); *G06K 9/6202* (2013.01); *G06K 9/6267* (2013.01)

(58) Field of Classification Search
CPC .......... G06K 9/00677; G06K 9/00684; G06K 9/6202; G06K 9/6267; G06T 11/60
See application file for complete search history.

(56) References Cited

U.S. PATENT DOCUMENTS

2009/0116752 A1* 5/2009 Isomura ............ G06F 17/30265
382/217

* cited by examiner

*Primary Examiner* — Manuchehr Rahmjoo
(74) *Attorney, Agent, or Firm* — Canon U.S.A., Inc. IP Division

(57) ABSTRACT

An apparatus includes a first acquisition unit configured to acquire main object information specifying a main object in generation of a layout image, a second acquisition unit configured to acquire object correlation information specifying an object having a correlation with the main object, an extraction unit configured to extract at least one image including the main object and at least one image including the object having the correlation with the main object from a plurality of images based on the acquired main object information and the acquired object correlation information acquired, and a generation unit configured to generate, using a layout template, a layout image in which the at least one image extracted by the extraction unit and including the main object and the at least one image extracted by the extraction unit and including the object having the correlation with the main object are laid out therein.

30 Claims, 12 Drawing Sheets

FIG. 8A

| PERSONAL ID | NAME | RELATIONSHIP | AFFILIATION |
|---|---|---|---|
| 1 | A | BRIDE | FAMILY OF A, SCHOOL OF A, COMPANY OF A AND B |
| 2 | B | GROOM | FAMILY OF B, COMPANY OF A AND B |
| 3 | C | MOTHER OF A | FAMILY OF A |
| 4 | D | FATHER OF A | FAMILY OF A |
| 5 | E | AUNT OF A | FAMILY OF A |
| 6 | F | FRIEND OF A | SCHOOL OF A |
| 7 | G | MOTHER OF B | FAMILY OF B |
| 8 | H | ELDER BROTHER OF B | FAMILY OF B |
| 9 | I | COLLEAGUE OF A | COMPANY OF A AND B |
| 10 | J | COLLEAGUE OF B | COMPANY OF A AND B |
| 11 | K | PRIEST | NONE |
| 12 | L | ATTENDANT | NONE |

FIG. 9A

| PERSONAL ID | NAME | RELATIONSHIP | CORRELATION ID |
|---|---|---|---|
| 1 | A | BRIDE | 2, 3, 4, 5, 6, 9 |
| 2 | B | GROOM | 1, 7, 8, 10 |
| 3 | C | MOTHER OF A | 1, 4, 5 |
| 4 | D | FATHER OF A | 1, 3, 5 |
| 5 | E | AUNT OF A | 1, 3, 4 |
| 6 | F | FRIEND OF A | 1 |
| 7 | G | MOTHER OF B | 2, 8 |
| 8 | H | ELDER BROTHER OF B | 2, 7 |
| 9 | I | COLLEAGUE OF A | 1 |
| 10 | J | COLLEAGUE OF B | 2 |
| 11 | K | PRIEST | - |
| 12 | L | ATTENDANT | - |

FIG. 10

```xml
<?xml version="1.0" encoding="utf-8"? >
<IMAGEINFO>
        <BaseInfo>
                <ID>0x00000001</ID>
                <ImagePath>C:¥My Picture¥IMG0001.jpg</ImagePath>
                <ImageSize width=3000, height=2000 />
                <CaptureDateTime>20100101:120000<CaptureDateTime>
        </BaseInfo>
        <SensInfo>
                <AveY>122</AveY>
                <AveS>38</AveS>
                <AveH>50</AveH>
                <SceneType>Landscape</SceneType>
                <Person>
                        <ID>0</ID>
                        <Position>
                                <LeftTop x=420, y=200/>
                                <LeftBottom x=420, y=300/>
                                <RightTop x=520, y=200/>
                                <RightBottom x=520, y=300/>
                        </Position>
                        <AveY>128</AveY>
                        <AveCb>-20</AveCb>
                        <AveCr>20</AveCr>
                </Person>
                . . .
        </SensInfo>
        <UserInfo>
                <FavoriteRate>3</FavoriteRate>
                <ViewingTimes>5</ViewingTimes>
                <PrintingTimes>3</PrintingTimes>
                <Event>Travel</Event>

</UserInfo>
        . . .
</IMAGEINFO>
```

IMAGE PROCESSING APPARATUS AND IMAGE PROCESSING METHOD

CROSS-REFERENCE TO RELATED APPLICATIONS

This application is a Continuation of U.S. patent application Ser. No. 15/162,322, filed May 23, 2016, which is a Continuation of U.S. patent application Ser. No. 14/668,792, filed Mar. 25, 2015, now U.S. Pat. No. 9,373,037, which is a Continuation of U.S. patent application Ser. No. 13/934,400, filed Jul. 3, 2013, now U.S. Pat. No. 9,014,487, which claims the benefit of Japanese Application No. 2012-153670, filed Jul. 9, 2012, all of which are hereby incorporated by reference herein in their entirety.

BACKGROUND OF THE INVENTION

Field of the Invention

The present invention relates to an apparatus and a method for outputting a layout image including a predetermined object.

Description of the Related Art

Conventionally, methods have been known in which photographs taken with a digital camera are used to produce a variety of products such as an album. Japanese Patent Application Laid-Open No. 2008-217479 discusses an image layout method including selecting a template and an image of a target person, extracting the target person from an image database, and automatically laying out the image according to an attribute of each area of the template.

However, the image layout method discussed in Japanese Patent Application Laid-Open No. 2008-217479 can only generate a layout image with a focus on the target person. Hence, the image layout method has a problem that variations of layout images that can be generated are limited. Furthermore, the image layout method discussed in Japanese Patent Application Laid-Open No. 2008-217479 cannot generate a layout image that takes into consideration a relationship between the target person and other persons.

SUMMARY OF THE INVENTION

The present invention is directed to an apparatus and a method capable of overcoming the problems of the conventional techniques and outputting a layout image in which a desired object is laid out as appropriate.

According to an aspect of the present invention, an apparatus includes a first acquisition unit configured to acquire main object information specifying a main object in generation of a layout image, a second acquisition unit configured to acquire object correlation information specifying an object having a correlation with the main object, an extraction unit configured to extract at least one image including the main object and at least one image including the object having the correlation with the main object from a plurality of images based on the main object information acquired by the first acquisition unit and the object correlation information acquired by the second acquisition unit, and a generation unit configured to generate, using a layout template, a layout image in which the at least one image extracted by the extraction unit and including the main object and the at least one image extracted by the extraction unit and including the object having the correlation with the main object are laid out.

Further features of the present invention will become apparent from the following description of exemplary embodiments with reference to the attached drawings.

BRIEF DESCRIPTION OF THE DRAWINGS

FIGS. 8A and 8B illustrate examples of object correlation information according to second and third exemplary embodiments of the present invention.

FIGS. 9A and 9B illustrate examples of object correlation information according to the second and third exemplary embodiments.

FIG. 10 illustrates an example of a storage format of a result of image analysis according to the first exemplary embodiment.

DESCRIPTION OF THE EMBODIMENTS

Various exemplary embodiments, features, and aspects of the invention will be described in detail below with reference to the drawings. As used herein, the terms "main object," "main person," and "main target" refer to the same meaning. The following exemplary embodiments are not intended to limit the scope of the invention set forth in the claims, and not every feature of combinations described in the exemplary embodiments is always necessary for a technical solution of the present invention.

Figure 1:
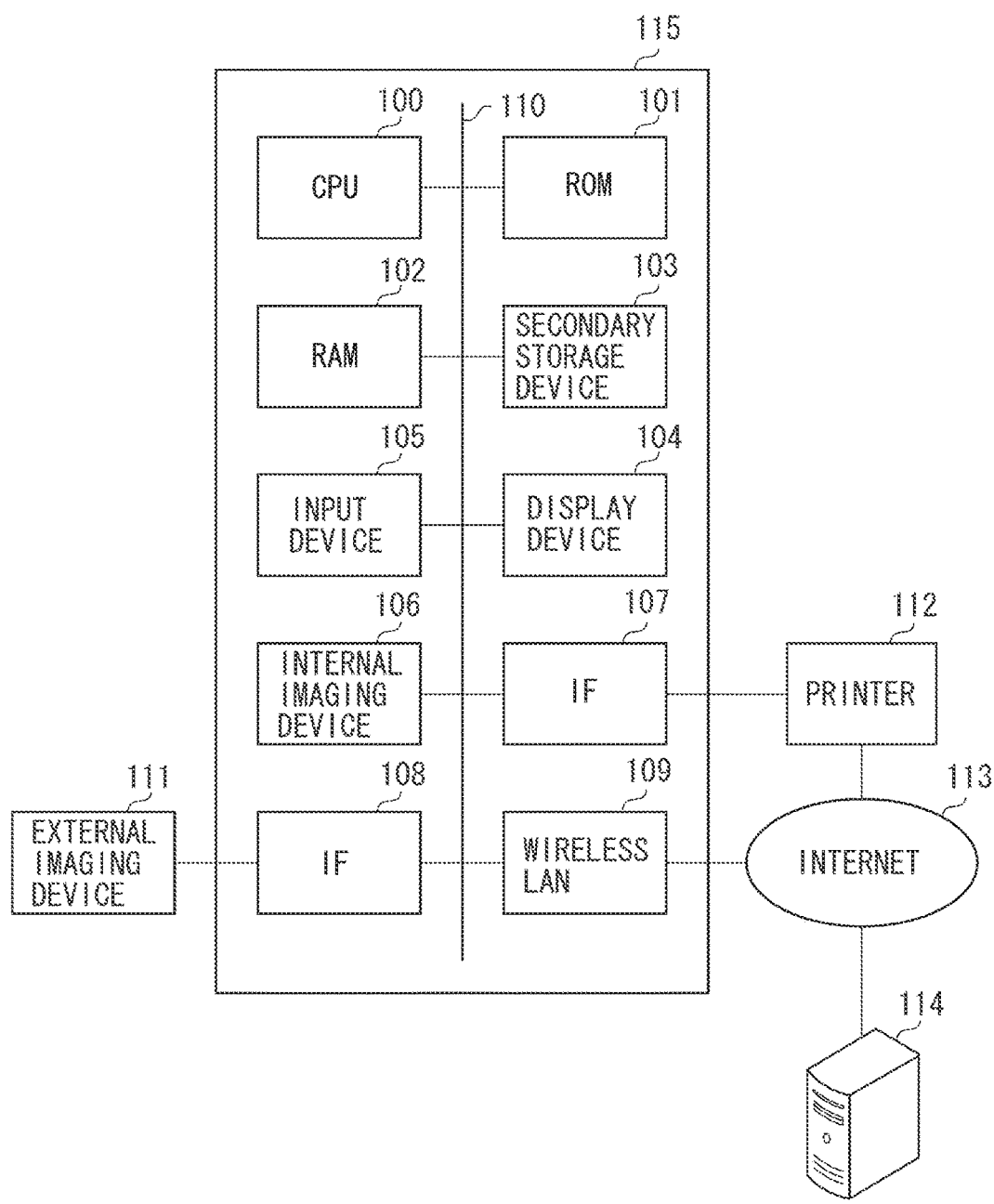
FIG. 1 is a diagram illustrating a hardware configuration of an image processing apparatus according to a first exemplary embodiment of the present invention.

FIG. 1 is a block diagram illustrating an example of a hardware configuration of an image processing apparatus according to a first exemplary embodiment of the present invention.

In FIG. 1, an information processing apparatus 115 includes a central processing unit (CPU) 100, a read only memory (ROM) 101, a random access memory (RAM) 102, a secondary storage device 103, a display device 104, an input device 105, an interface (IF) 107, an IF 108, and a wireless local area network (LAN) 109. The information processing apparatus 115 further includes an internal image capturing device 106. The foregoing components are connected to one another via a control bus/data bus 110. The information processing apparatus 115 according to the present exemplary embodiment functions as an image processing apparatus.

The information processing apparatus 115 is, for example, a computer. The CPU 100 executes information processing, which will be described in the first exemplary embodiment, according to a program. The ROM 101 stores programs including applications and operating systems (OS), which will be described below, that are to be executed by the CPU 100. The RAM 102 provides a memory configured to store a variety of information temporarily at the time of execution of a program by the CPU 100. The secondary storage device 103 is a storage medium such as a hard disk configured to store a database that stores image files and results of image analysis. The display device 104 is a device such as a display configured to present results of processing of the first exemplary embodiment to a user. The display device 104 may possess a touch panel function. The input device 105 is a mouse or a keyboard with which a user inputs an instruction to execute image correction processing.

An image captured by the internal image capturing device 106 is stored in the secondary storage device 103 after predetermined image processing. The information processing apparatus 115 can also read image data from an external imaging device 111 connected via an interface (IF 108). The wireless LAN 109 is connected to the Internet 113. The information processing apparatus 115 can also acquire image data from an external server 114 connected to the Internet 113.

A printer 112 configured to output images is connected to the information processing apparatus 115 via the IF 107. The printer 112 is also connected to the Internet 113 and can transmit and receive print data via the wireless LAN 109.

Figure 2:
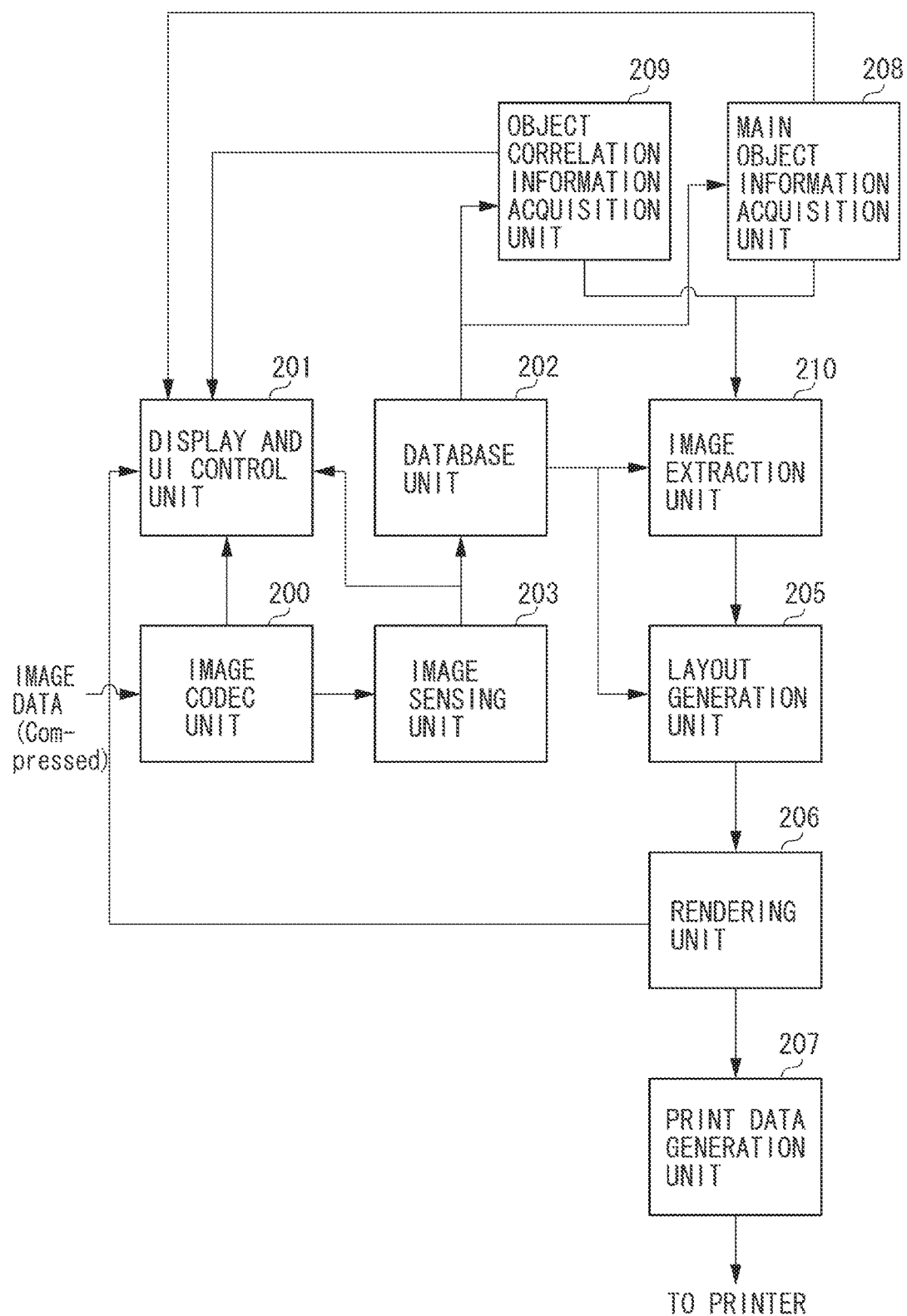
FIG. 2 is a block diagram illustrating software of the image processing apparatus according to the first exemplary embodiment.

FIG. 2 is a block diagram illustrating a software configuration including an application according to the present exemplary embodiment.

Generally, image data acquired by the information processing apparatus 115 is compressed in a compression format such as Joint Photographic Experts Group (JPEG). Hence, an image codec unit 200 decompresses the image data based on the compression format to convert the image data into image data in a bitmap data format of a red-green-blue (RGB) dot sequential system (bitmap data). The converted bitmap data is transmitted to a display and an UI control unit 201 and displayed on the display device 104 such as a display.

The bitmap data is also input into an image sensing unit 203 (application), and the image sensing unit 203 executes a variety of image analysis processing, which will be described in detail below. A variety of image attribute information obtained as a result of the analysis processing is stored according to a predetermined format in the secondary storage device 103 by a database unit 202 (application). In the present exemplary embodiment, the image attribute information includes main object information and object correlation information. Hereinafter, the terms image analysis processing and sensing processing will be used interchangeably.

An object correlation information acquisition unit 209 (application) acquires the object correlation information stored in the database unit 202. A main object information acquisition unit 208 (application) acquires the main object information stored in the database unit 202.

An image extraction unit 210 (application) extracts an image from the database unit 202 based on the main object information and the object correlation information.

A layout generation unit 205 (application) executes processing to automatically generate a layout where image data is to be laid out by use of the image extracted by the image extraction unit 210.

A rendering unit 206 renders the generated layout into display bitmap data. The bitmap data, which is a rendering result, is transmitted to the display and UI control unit 201, and contents of the bitmap data are displayed on the display device 104. The rendering result is also transmitted to a print data generation unit 207. The print data generation unit 207 converts the rendering result into printer command data and transmits the converted printer command data to the printer 112.

Figure 3:
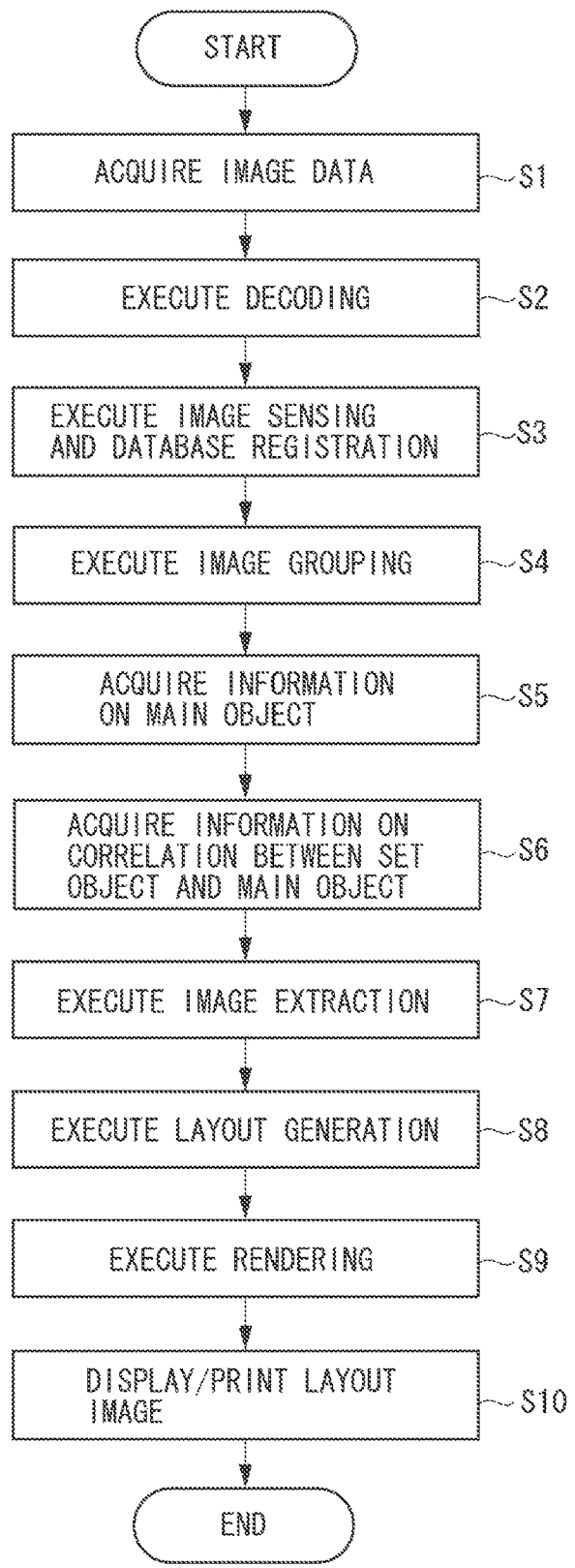
FIG. 3 is a flow chart illustrating image processing according to the first exemplary embodiment.

A flow of image processing is described in detail below with reference to FIG. 3. FIG. 3 is a flow chart illustrating processing executed in the software configuration illustrated in FIG. 2.

In step S1, the information processing apparatus 115 acquires image data.

In step S2, decoding processing of the acquired image data is executed. First, the image sensing unit 203 searches for newly-stored image data that has not undergone the sensing processing yet. Then, the image codec unit 200 converts (decodes) each extracted image from image data (compressed image data) into bitmap data. The converted bitmap data is transmitted to the display and UI control unit 201 to be displayed on the display device 104 such as a display.

In step S3, image sensing and database registration are executed. Specifically, the bitmap data is input into the image sensing unit 203, and the image sensing unit 203 executes a variety of analysis processing. A variety of image attribute information obtained as a result of the analysis processing is stored according to a predetermined format in the secondary storage device 103 by the database unit 202.

In step S4, image grouping processing is executed. Specifically, the input image is classified according to individual persons recognized by the image analysis.

In step S5, main object information acquisition processing is executed. Specifically, the main object information acquisition unit 208 acquires, from the database unit 202, information on a human object to be set as a main object when a layout image is generated.

In step S6, the object correlation information acquisition unit 209 acquires, from the database unit 202, information on a correlation between a set human object and a main person.

In step S7, the image extraction unit 210 extracts an appropriate image from the database unit 202 based on the acquired main object information and the object correlation information, i.e., the information on the correlation between the set human object and the main person. Specifically, the image extraction unit 210 extracts an image of a human object set in the object correlation information, with a focus on an image of a designated main person. The display and UI control unit 201 controls the extracted image so that the display device 104 displays the extracted image.

In step S8, the layout generation unit 205 executes automatic layout generation processing.

In step S9, rendering is executed. Specifically, the rendering unit 206 renders the generated layout into display bitmap data.

In step S10, a layout image is displayed and/or printed based on the rendering result. Specifically, the bitmap data obtained in step S9 is transmitted to the display and UI control unit 201, and the result is displayed on the display. The bitmap data is also transmitted to the print data generation unit 207, and the print data generation unit 207 converts the transmitted bitmap data into printer command data and transmits the converted printer command data to the printer 112.

The following describes each processing in detail.

The acquisition of an image data group in step S1 is executed as follows. For example, a user connects an image capturing apparatus or a memory card storing captured images to the information processing apparatus 115, and the information processing apparatus 115 reads the captured images from the image capturing apparatus or the memory card to acquire an image data group. Alternatively, the information processing apparatus 115 may acquire an image data group by reading images captured by an internal image capturing device and stored in a secondary storage device. Further alternatively, the information processing apparatus 115 may acquire images from an apparatus other than the information processing apparatus 115, such as the external server 114 connected to the Internet 113, via the wireless LAN 109.

The following describes the sensing processing (image analysis processing) executed in step S3. An application executes a variety of analysis processing and database registration of analysis results with respect to each acquired image data group.

As used herein, the sensing processing includes a variety of processing specified in Table 1. Examples of sensing processing in the present exemplary embodiment include face detection, basic image feature quantity analysis, and scene analysis, which respectively provide calculation results of the data type specified in Table 1.

TABLE 1

| Main class of sensing | Sub class of sensing | Data type | Value |
|---|---|---|---|
| Basic image feature quantity | Average luminance | int | 0 to 255 |
| | Average color saturation | int | 0 to 255 |
| | Average hue | int | 0 to 359 |
| Face detection | Number of faces of human objects | int | 0 to MAXFACE |
| | Coordinate position | int * 8 | 0 to Width or Height |
| | Average of Y in face region | int | 0 to 255 |
| | Average of Cb in face region | int | −128 to 127 |
| | Average of Cr in face region | int | −128 to 127 |
| Scene analysis | Scene result | char | Landscape Nightscape Portrait Underexposure Others |

The following describes each sensing processing.

The overall average luminance and the overall average color saturation, which are basic image feature quantities, may be calculated by, for example, a publicly-known method. Thus, detailed description is omitted. The average luminance may be calculated by converting (conversion equation is omitted) RGB components of each pixel of an image into publicly-known brightness/color-difference components (for example, YCbCr components) and then calculating an average value of the Y component. The average color saturation may be calculated by calculating a value of S for the CbCr components of each pixel using formula (1) below and then calculating an average value of S.

$$S=\sqrt{Cb^2+Cr^2} \quad (1)$$

The average hue (AveH) of an image is a feature quantity for evaluating the color tone of the image. The hue of each pixel can be calculated using a publicly-known hue-intensity-saturation (HIS) conversion equation, and AveH can be calculated by averaging the calculated hues of the entire image.

The foregoing feature quantities may be calculated for an entire image, or, for example, an image may be divided into regions of predetermined size, and the feature quantities may be calculated for each region.

The following describes detection processing of faces of human objects. Various publicly-known methods may be used as a method for the detection of faces of human objects in the present exemplary embodiment.

In a method discussed in Japanese Patent Application Laid-Open No. 8-63597, a matching level between an image and a plurality of templates in the shape of a face is calculated. Then, a template with the highest matching level is selected, and if the highest matching level is equal to or higher than a predetermined threshold value, then a region in the selected template is determined as a candidate face region. The positions of eyes can be detected using the template.

In a method discussed in Japanese Patent Application Laid-Open No. 2000-105829, first, an entire image or a designated region of an image is scanned using a nose image pattern as a template, and a position that most closely matches is output as a nose position. A region of the image above the nose position is considered to include eyes. Hence, an eye-existing region is scanned using an eye image pattern as a template to execute matching, and a set of candidate eye-existing positions, which is a set of pixels with a higher matching level than a predetermined threshold value, is obtained. Then, continuous regions included in the set of candidate eye-existing positions are separated as clusters, and the distance between each cluster and the nose position is calculated. A cluster with the shortest distance from the nose position is determined as an eye-existing cluster, whereby the position of the organ is detected.

Examples of other methods for the detection of faces of human objects include methods of detecting positions of faces and organs discussed in Japanese Patent Application Laid-Open No. 8-77334, Japanese Patent Application Laid-Open No. 2001-216515, Japanese Patent Application Laid-Open No. 5-197793, Japanese Patent Application Laid-Open No. 11-53525, Japanese Patent Application Laid-Open No. 2000-132688, Japanese Patent Application Laid-Open No. 2000-235648, and Japanese Patent Application Laid-Open No. 11-250267. A method discussed in Japanese Patent No. 2541688 may also be used. The method for the detection of faces of human objects is not particularly limited.

The feature quantities of a face region can be analyzed by the face detection processing of human objects. For example, the number of faces of human objects and the coordinate position of each face can be obtained for each input image. Since the coordinate positions of the faces in the image are obtained, average values of YCbCr components of pixels included in each face region can be calculated to obtain the average luminance and the average color difference of each face region.

Scene analysis processing can be executed using the feature quantities of images. Scene analysis processing can be executed by, for example, a method discussed in Japanese Patent Application Laid-Open No. 2010-251999 or Japanese Patent Application Laid-Open No. 2010-273144. As a result of the scene analysis, identifications (IDs) for discriminating image-captured scenes such as landscape, nightscape, portrait, underexposure, and others are obtained.

Although the sensing information is obtained by the sensing processing in the present exemplary embodiment, the present invention is not limited to the present exemplary embodiment, and other sensing information may also be used.

The obtained sensing information described above is stored in the database unit 202. The format of storage in the database is not particularly limited. For example, the sensing information may be written in a general format (for example, extensible markup language (XML)) and stored.

The following describes an exemplary case in which attribute information for each image is written in three separate categories as illustrated in FIG. 10.

The first tag, BaseInfo tag, is a tag for storing information that is added to an acquired image file in advance as an image size and information on the time of image capturing. The tag includes an identifier ID of each image, storage location at which image files are stored, image size, and information obtained at the time of image capturing such as a place of image capturing, time, in-focus position, and presence or absence of a flash.

The second tag, SensInfo tag, is a tag for storing the results of image analysis processing. The tag stores the average luminance, average color saturation, average hue, and scene analysis results of an entire image. The tag also stores information on human objects existing in images, face position, face size, number of faces, and face complexion.

The third tag, UserInfo tag, is a tag for storing information indicating the favorite degree that is input by a user for each image and history information on the usage of images such as the number of times of printing and viewing through an application and the number of times of transmissions through the Internet.

The method for the database storage of image attribute information is not limited to the foregoing method, and the image attribute information may be stored in any other format.

The following describes the image grouping processing executed in step S4. In step S4, identical human objects are recognized using the detected face information to generate an image group for each human object.

A method of executing recognition of human objects is not particularly limited. For example, a publicly-known method for the recognition of individual persons may be used to execute the recognition of human objects. Recognition processing of individual persons is executed mainly by extracting feature quantities of organs existing within a face such as eyes and a mouth and comparing similarity levels of relationship of the feature quantities. A specific method of recognition processing of individual persons is discussed in, for example, Japanese Patent No. 3469031 and elsewhere. Thus, detailed description is omitted.

Referring back to FIG. 3, the image grouping processing executed in step S4 is described below.

In the image grouping processing, feature quantities of faces included in an image are calculated, and images with similar feature quantities are grouped as face images of the same human object to give the same human object identifier (ID). As used herein, the feature quantities of faces include the positions and sizes of organs such as eyes, a mouth, and a nose, and a facial contour. A face image that has been given an ID is written in a person tag of the image.

Figure 4:
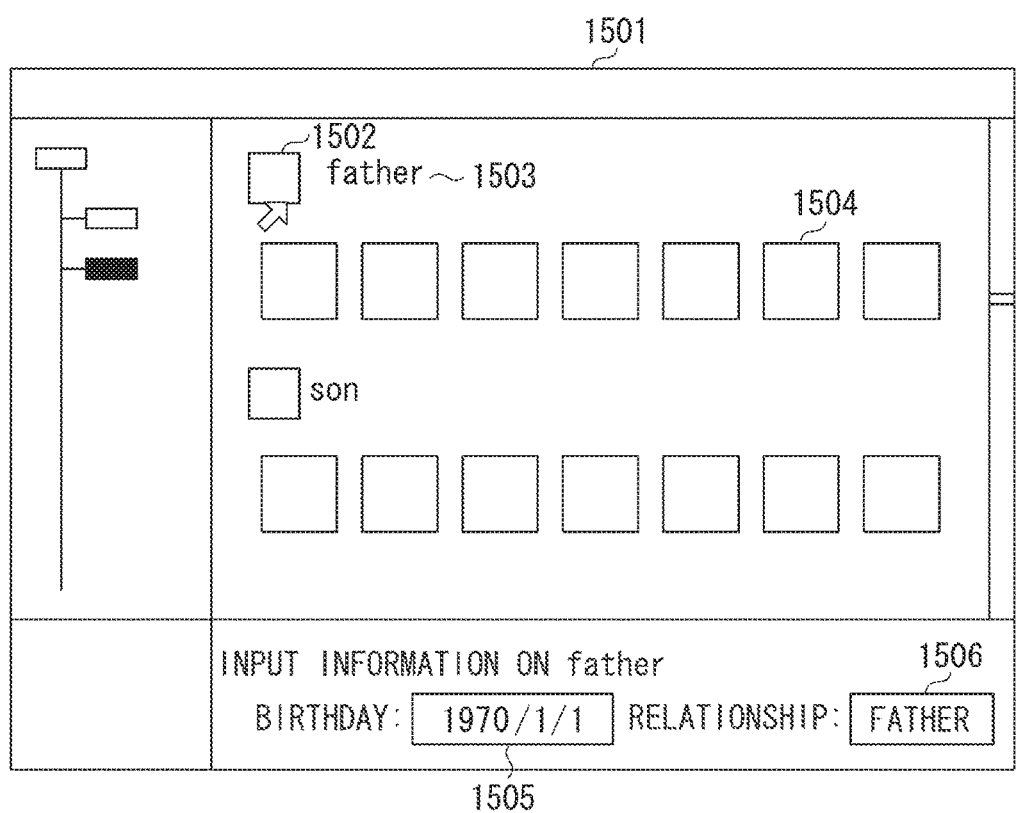
FIG. 4 illustrates a display example of an image group of each human object according to the first exemplary embodiment.

The image group of each human object obtained by the foregoing processing is displayed on the display device 104. In the present exemplary embodiment, the image group is displayed on a UI 1501 illustrated in FIG. 4. In FIG. 4, a region 1502 displays a representative face image of the image group of the human object. A region 1503 next to the region 1502 displays a name of the human object ("father" in this case). A region 1504 displays thumbnails of face images of images included in the image group. Specifically, the region 1504 displays a plurality of face images recognized as including the human object.

When a human object ("son") other than "father" is recognized, an image group of face images including the son is displayed as in the foregoing case.

Information on each human object can be input via an input unit on the UI 1501. For example, a birthday can be input via a first input unit 1505, and relationship information can be input via a second input unit 1506.

Figure 5:
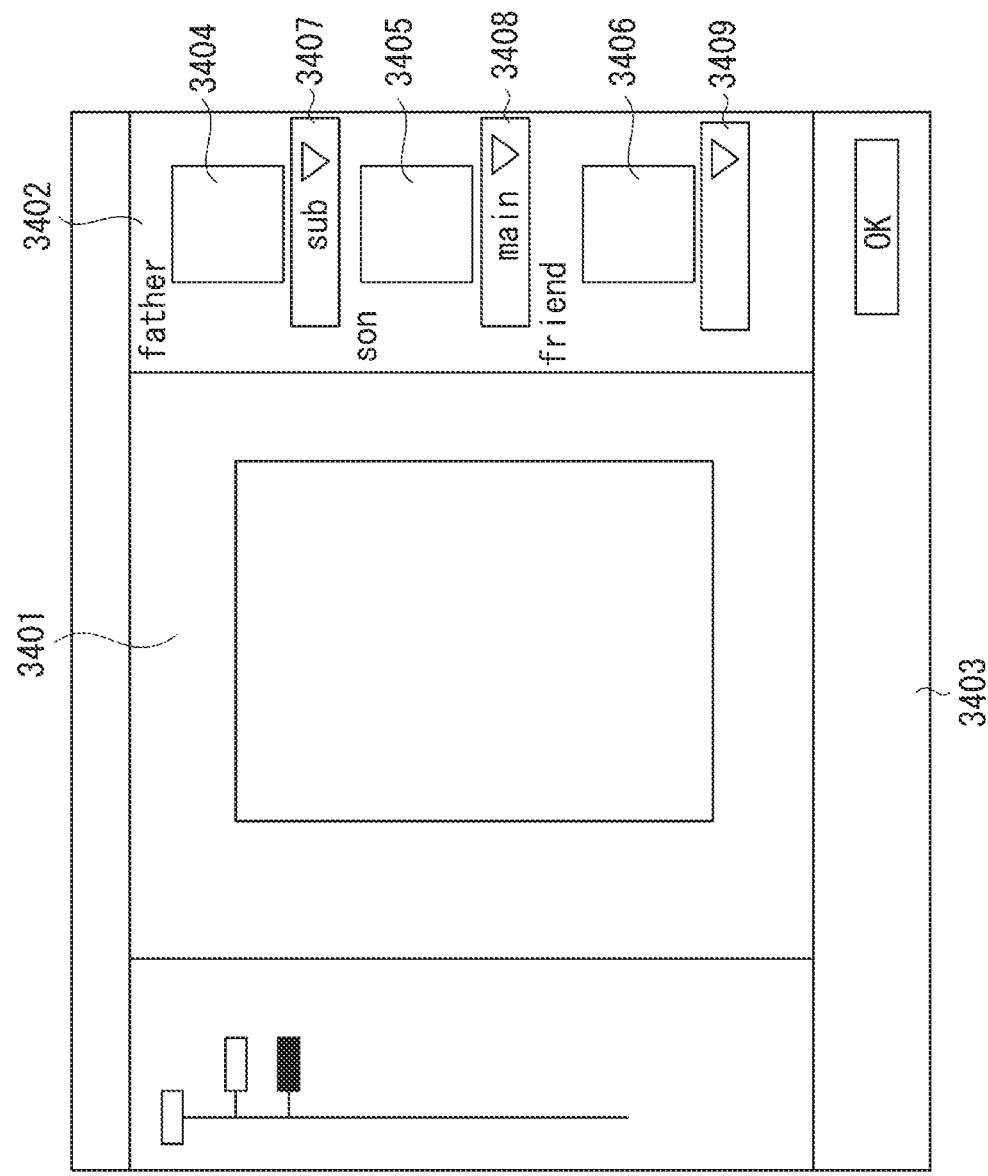
FIG. 5 illustrates an example of a user interface (UI) for setting main object information and object correlation information according to the first exemplary embodiment.

The following describes the main object information acquisition processing executed in step S5 and the object correlation information acquisition processing executed in step S6. In the main object information acquisition processing executed in step S5, information on a human object to be prioritized at the time of image extraction (main object information) is acquired. In the object correlation information acquisition processing executed in step S6, information on an object having a correlation with the main person is acquired with respect to the main object information determined in step S5. For example, information on an object having a close relation with the main person is acquired. The object correlation information specifies a human object to be prioritized next to the main person at the time of image extraction. The following describes a method of determining the main object information and the object correlation information with reference to FIG. 5. FIG. 5 is a view illustrating a user interface for determining the main object information and the object correlation information. This user interface is displayed on, for example, the display device 104.

In FIG. 5, a work area 3401 is a display area for displaying a variety of information at the time of execution of an application, prompting a user to select, and showing a preview. A work area 3402 is an area for displaying a recognized human object. A work area 3403 is an area for displaying a button for various operations.

The work area 3402 displays a representative image of a human object recognized as individual persons in steps S3 and S4. For example, when "father," "son," and "friend" are recognized as individual persons, work areas 3404, 3405, and 3406 in the work area 3402 display representative images of "father," "son," and "friend," respectively, as illustrated in FIG. 5. The work area 3402 includes menu buttons 3407, 3408, 3409 for setting the main object information and the object correlation information for each human object.

A user can set the main object information and the object correlation information by operating the menu buttons. For example, when "son" is set to "main" as a human object to be prioritized and "father" is set to "sub" as a human object to be prioritized next to the main object, "son" is set as the main object information and "father" is set as the object correlation information. When "friend" is set to "sub" in place of "father," "friend" is set as a human object to be prioritized next to the main person.

In the present exemplary embodiment, a single object is settable for each of the "main" object and the "sub" object. However, the present invention is not limited to the present exemplary embodiment, and a plurality of objects may be set for each of the "main" object and the "sub" object.

The method of setting the main object information and the object correlation information is not limited to the foregoing method. For example, the main object information and the object correlation information may be set based on main object information and object correlation information stored in advance in a storage device. The object correlation information may be information on a correlation level between each personal ID and other personal IDs (order of closeness) or information on grouping such as "family," "school," and "company."

In step S7, appropriate images are extracted based on the acquired main object information and the acquired object correlation information. Specifically, with a focus on images of the designated main person, at least one image of each human object considered to have a close relation with the main person is extracted. For example, the percentage of images including the main person (main object) in all images extracted at the time of image extraction may be set to a predetermined percentage or higher. Similarly, the percentage of images including an object having a correlation with the main person (main object) in all images extracted at the time of image extraction may be set to a predetermined percentage or higher. For example, the total of the percentage of images including the main object in all extracted images and the percentage of images including an object having a correlation with the main object in all extracted images may be set to 50% or higher. The percentage of images including the main object in all extracted images may be set to 30% or higher, and the percentage of images including an object having a correlation with the main object may be set to 20% or higher. At this time, an image including both the main object and an object having a correlation with the main object may be counted not as an image including an object having a correlation with the main object but as an image including the main object. Alternatively, an image including both the main object and an object having a correlation with the main object may be counted not as an image including the main object but as an image including an object having a correlation with the main object. Images may be filtered to extract only images including the main person and images including an object having a correlation with the main person. Images may also be filtered not to extract images including a human object considered to have little relation with the main person.

Images may also be filtered such that while images including a human object having little or no relation with the main person are not extracted as an image of a human object, images including no human object such as a landscape are extracted. The percentage of images including the main object and the percentage of images including an object having a relation with the main object may be set by a user as appropriate or may be set to predetermined percentages in advance. The extracted images are displayed on the display device 104 by the display and UI control unit 201.

Figure 6:
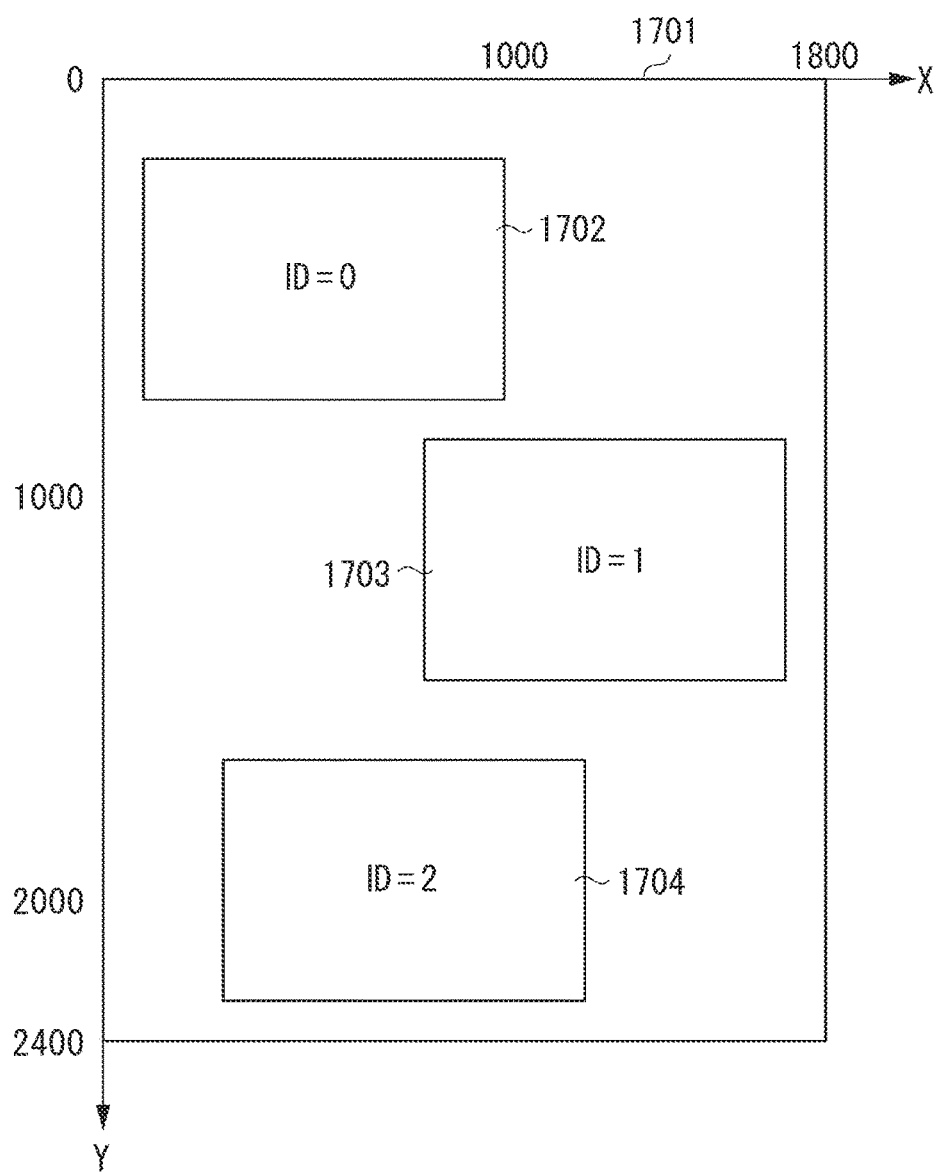
FIG. 6 illustrates an example of a layout template according to the first exemplary embodiment.

The following describes the layout generation processing executed in step S8. In the present exemplary embodiment, the layout generation processing is executed using a variety of layout templates prepared in advance. Examples of layout templates include a layout template in which a plurality of image layout frames are provided on a layout image. The present exemplary embodiment employs a layout template in which a plurality of image layout frames 1702, 1703, and 1704 are provided on a sheet scale for a layout as illustrated in FIG. 6. Hereinafter, the image layout frames are also referred to as slots. The page size (for example, "A4") and the page resolution (for example, "300 dpi") are set as basic information for each layout template. Positional information and shape information (for example, "rectangle") are set for each slot. The layout template may be acquired from, for example, layout templates stored in advance in the secondary storage device 103 at the time of installation of software for the execution of the present exemplary embodiment into the information processing apparatus 115. Alternatively, a template group may be acquired from the external server 114 existing on the Internet 113 connected via the IF 107 or the wireless LAN 109.

A layout is generated using a combination of information on a determined theme of the layout to be generated and a determined template, information on the main person, information on a correlation with the main person, and information on a set of selected images to be used to generate the layout. The theme of the layout determines an outline of the layout, and examples include a growth record, a wedding ceremony, a trip, and a graduation ceremony. In the present exemplary embodiment, one or more appropriate layout templates for each layout theme are prepared. Based on the foregoing information, image data to be used is selected from the set of image data and laid out to generate the layout. When the number of extracted images is fewer than the number of slots included in the layout template, the template may be changed. A method of generating a layout is not particularly limited, and examples include a method in which an image characteristic of an image to be laid out is determined in advance for each slot, and an image matching the determined image characteristic is selected and laid out. The image characteristic is, for example, information obtained by the analysis processing such as a specific captured human object, the number of human objects, image brightness, image capturing information such as photographed time, and usage information such as print frequency.

For example, the image characteristics "an image of the main person, a bright image, and an image with the face at the center" are designated for the slot 1702. The image characteristics "an image of the main person and an image of the human object having a close relation with the main person" are designated for the slot 1703. The image characteristic "landscape" is designated for the slot 1704. "Son" is set as the main person, and "father" is set as a human object having a close relation with the main person. Accordingly, in the layout generation processing, an image satisfying the condition designated for each slot is selected and laid out. Specifically, an image of "son" is laid out in the slot 1702. An image including both "son" and "father" is laid out in the slot 1703. A landscape image including neither "son" nor "father" is laid out in the slot 1704.

The method of generating a layout is not limited to the foregoing method, and other examples include a method including generating a large number of layouts with extracted images being laid out, evaluating the generated layouts according to a given function, and determining a layout from upper ranked layouts. The evaluation may be, for example, a comprehensive evaluation based on a plurality of criteria such as image characteristics, degree of matching in shape with a slot, layout balance, and conformity with the theme.

It is more suitable to use attribute information on the main person at the time of generation and evaluation of layouts. Use of attribute information on the main person enables trimming to obtain a close-up of a face of the main person and also enables selection of an image in which a face of the main person appears with appropriate brightness. When an image including both the main person and a human object having a close relation with the main person is requested, an image in which the in-focus position matches the positions of the main person and the human object is selected by reference to the image capturing information. A combination of a variety of information enables generation of better layouts.

In the present exemplary embodiment, images can be extracted with a focus on images including the main person and images including a human object having a relation with the main person. Thus, a layout image including images laid out with a focus on images including the main person and images including a human object having a relation with the main person can be generated without designating an image characteristic of an image to be laid out for each slot. Furthermore, a layout image including images laid out with a focus on images including the main person and images including a human object having a relation with the main person can be generated by only designating a human object or a landscape as an image characteristic for each slot without designating details of the human object.

Figure 7:
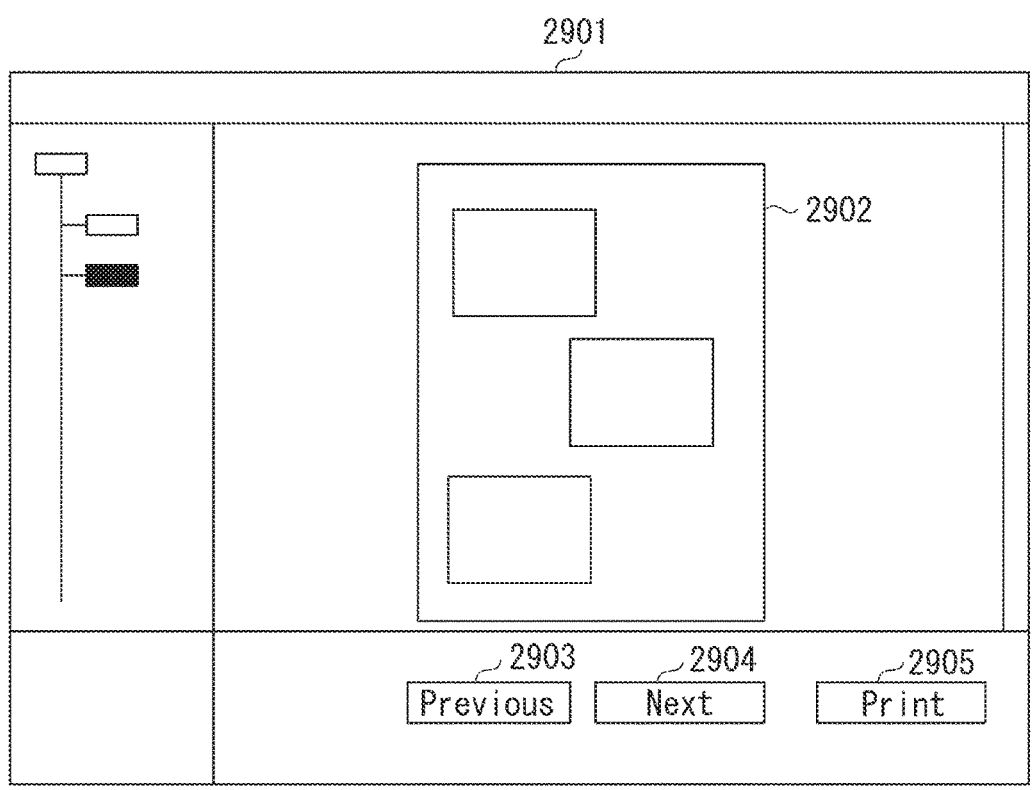
FIG. 7 illustrates a display example of a result of layout generation according to the first exemplary embodiment.

The generated layout is rendered using a rendering function of an OS operating on the information processing apparatus 115 and displayed on the UI. In the present exemplary embodiment, a region 2902 as illustrated in FIG. 7 is displayed. FIG. 7 includes the region 2902 for displaying the generated layout and various execution buttons including a previous button 2903, a next button 2904, and a print button 2905.

Another layout can be presented in response to a user operation of pressing the next button 2904. In other words, the user can view a variety of layouts by pressing the next button 2904. The user can press the previous button 2903 to redisplay a layout that was previously displayed. When the user likes a displayed layout, the user can press the print button 2905 to print out the layout result from the printer 112 connected to the information processing apparatus 115.

In the present exemplary embodiment, as described above, images are extracted based on the main object information and the object correlation information so that a layout image including images laid out with a focus on not only the main person but also one or more other human objects having a relation with the main person can be obtained.

In other words, not only a target human object (main person) but also a human object having a relation with the target human object can be selected to generate a desired layout image. This image processing method is effective especially when, for example, a layout image as a gift for a human object having a relation with the main person of the theme is desired to be obtained.

Advantages of the present exemplary embodiment will be described briefly below using a wedding ceremony as an example. In a scene where a large number of images are captured such as a wedding ceremony, there are a large number of human objects such as relatives and guests besides a groom and a bride who are main persons. At this time, human objects having little relation such as a priest and floor attendants are often photographed together although they are not intended to be photographed. However, when face recognition processing is executed with respect to the images, human objects included as small figures in the images such as floor attendants are also picked up as human objects existing in the images.

If a normal method of generating a layout image is used to generate a layout image of the wedding ceremony, unintended human objects may be laid out in the layout image. For example, in a method discussed in Japanese Patent Application Laid-Open No. 2008-217479, if "bride" is selected as a target human object (main person) to extract images, only a layout image with a focus on the bride can be generated.

In contrast, the present exemplary embodiment enables a user to obtain a layout image for each purpose of use with ease such as a gift for a friend of the bride or a gift for a relative of the groom. For example, a layout image with a focus on the bride and friends of the bride can be generated with ease by selecting "bride" as the main person and "friend" as a human object having a relation with the main person. At this time, two or more human objects may be set as friends. Further, a layout image with a focus on the groom and the grandmother of the groom can be generated with ease by selecting "groom" as the main person and "grandmother" as a human object having a relation with the main person. To generate different layouts for different main persons, different purposes of use, or different viewers from the same set of images, the main object information acquisition processing in step S5 and the subsequent processing may be repeated, whereby a user can obtain an appropriate layout simply by determining the main person and a human object having a relation with the main person.

A second exemplary embodiment of the present invention is similar to the first exemplary embodiment, except for the method of setting the object correlation information. Thus, duplicate description of similar aspects is omitted. In the present exemplary embodiment, the object correlation information is information on a relationship that is registered in advance for each human object.

Figure 8B:
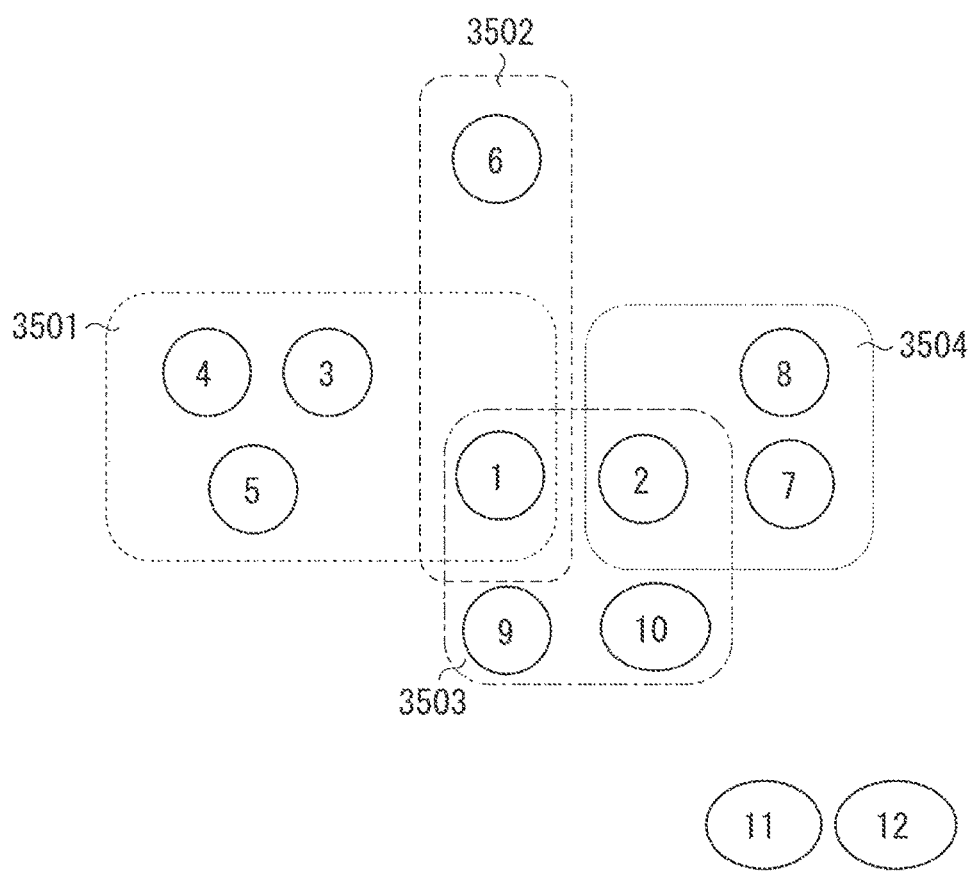

FIGS. 8A and 8B are views illustrating the object correlation information. FIG. 8A is a view illustrating human objects detected and recognized from a plurality of photographs captured in a wedding ceremony in the present exemplary embodiment. In FIG. 8A, 12 human objects are detected and recognized from the plurality of photographs. Each of the 12 human objects is given a personal ID (1, 2, ... 12), and a name (A, B, C ... ) and a relationship (bride, groom, mother of A ... ) are input. Affiliation information for grouping related human objects is added to each human object. For example, the human object A of ID=1 is set as belonging to a family of A 3501, a school of A 3502, and a company of A and B 3503. The human object B of ID=2 is set as belonging to a family of B 3504 and the company of A and B 3503. The human object C of ID=3 is set as belonging to the family of A 3501. The affiliation information is set for every human object. In this case, there may be a human object with affiliation=none such as the human objects K and L.

As a result of grouping the above 12 human objects into groups of related human objects, several affiliations (3501 to 3504) are formed as illustrated in FIG. 8B.

The affiliation information may be determined automatically from information input by a user such as relationships, names, and human object profiles. Alternatively, a user may perform grouping to manually set the affiliation information. A method of setting the affiliation information is not limited to the foregoing method. For example, the affiliation information may be determined based on image attribute information that is not intentionally input by a user, such as image analysis information, image capturing information, and usage information.

Examples of image analysis information include results of basic image feature quantity analysis such as brightness, color saturation, and hue of images, information on human objects existing in images, results of face analysis such as the number of faces, positions, face size, and face complexion, and results of scene analysis.

Image capturing information is information obtained at the time of capturing an image such as a place and a time of image capturing, an image size, an in-focus position, and presence or absence of a flash.

Usage information is history information on the usage of images such as the number of times of printing images, the number of times of displaying images, and the number of times of transmitting images through the Internet.

Based on the foregoing information, human objects can be classified into affiliations according to various criteria. Examples of criteria include: the human objects are/are not photographed together; the focus is the same/different; the captured time is close; the human objects are photographed by the same camera; the human objects are photographed in the same event; and the human objects are printed together. For example, if the human objects are often photographed together, then the human objects are classified into the same affiliation. If the human objects are not photographed together, then the human objects are classified into different affiliations. Even when the human objects are photographed together, if the focus is different, then the human objects are understood as being photographed together by chance and are, thus, classified into different affiliations. If, for example, image data has been accumulated for a long period of time, the human objects existing in images captured at close timings are determined to be the same affiliation. Alternatively, an affiliation may be determined based on a combination of a variety of information described above.

The following describes a method of determining the object correlation information according to the present exemplary embodiment using, as an example, a case of generating a layout for grandparents of A and a layout for grandparents of B.

In the case of the relationships specified in FIGS. 8A and 8B, when a layout for the grandparents of A is intended to be generated, "personal ID=1," which is A, is set as the main object information. Following the determination of the main object, "family of A, school of A, company of A and B," which are affiliations to which A belongs, are determined as the object correlation information from the affiliation information on the main object. When a layout for the grandparents of B is intended to be generated, "personal ID=2" of B is set as the main object information. In this case, similarly, "family of B, company of A and B," which are affiliations to which B belongs, are determined as the object correlation information from the affiliation information on the main object.

As in the present exemplary embodiment, when the object correlation information is determined in advance, correlation information on an object having a relation with the main object can be determined by simply switching the main object information. Thus, a user can determine the object correlation information without determining the object correlation information via the UI. This enables the image extraction unit 210 to extract appropriate images for the purpose of use for each user at the time of image extraction.

Figure 9B:
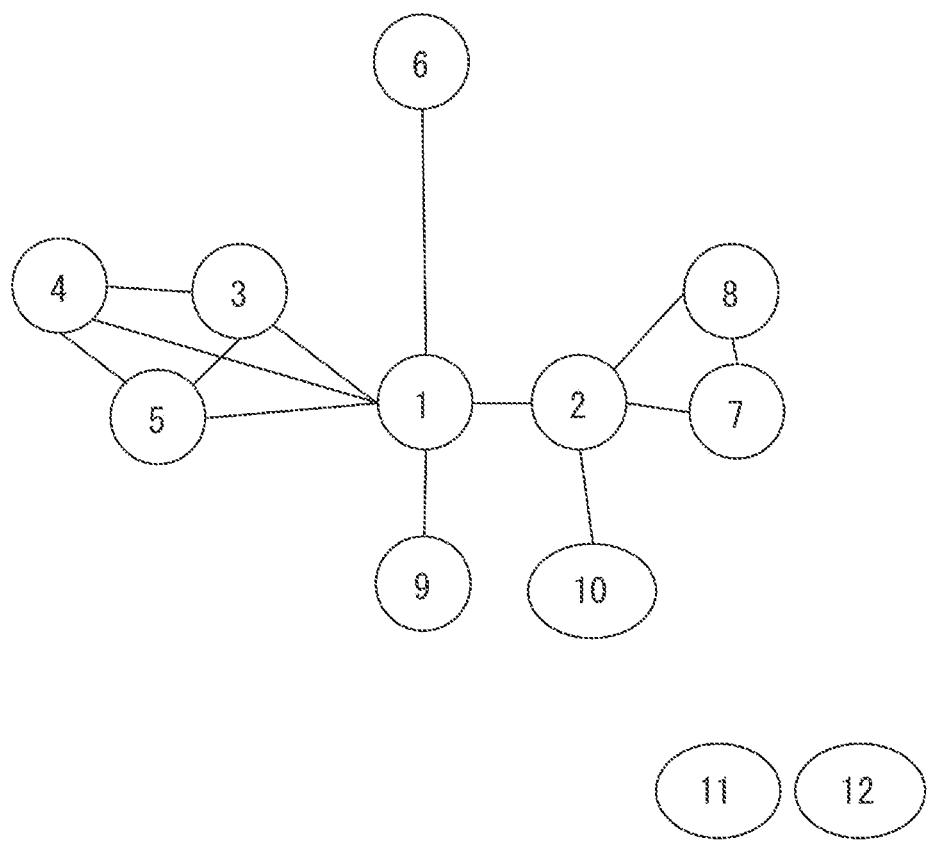

The object correlation information is not limited to the information determined by the method of classifying human objects into affiliations as in the above case. For example, the object correlation information may be determined based on information specifying correlations between human objects. Specifically, as illustrated in FIGS. 9A and 9B, the object correlation information may be determined based on information on correlations between each individual human object having an ID and other human objects. In FIG. 9A, the human object A of ID=1 has a correlation with the human objects of IDs=2, 3, 4, 5, 6, and 9. The human object B of ID=2 has a correlation with the human objects of IDs=1, 7, 8, and 10. The human object C of ID=3 has a correlation with the human objects of IDs=1, 4, and 5, and so on. The object correlation information is determined for every human object. In this case, there may be a human object having no correlation with any of the human objects, such as K and L. The object correlation information is determined based on a correlation ID set for each personal ID.

As in the case described with reference to FIGS. 8A and 8B, the object correlation information may be determined automatically from user input information, may be determined manually by a user, or may be determined automatically from information that is not intentionally input by a user such as image analysis information, image capturing information, and usage information.

The following describes a method of determining the object correlation information using, as an example, a case of generating a layout including the object correlation information as illustrated in FIGS. 9A and 9B.

As to a layout for the grandparents of A, if "personal ID=1," which is A, is set as the main object information, "2, 3, 4, 5, 6, and 9," which are correlation IDs of A, may be determined as the object correlation information. As to a layout for the grandparents of B, if "personal ID=2," which is B, is set as the main object information, "1, 7, 8, and 10," which are correlation IDs of B, may be set as the object correlation information.

In the present exemplary embodiment, information on the relationship is stored in advance for each registered human object, and the object correlation information on an object having a correlation with the main object is determined based on the stored information. This allows the object correlation information to be determined with ease each time when the main object information is switched, i.e., when the main object is changed. Thus, related images can be obtained with ease.

In the present exemplary embodiment, every affiliation to which the main object belongs may be selected as the object correlation information, or every human object determined as having a correlation with the main object may be selected as the object correlation information. This enables easy extraction of every human object having a correlation.

Traditionally, sorting of images for each human object requires a lot of work. In contrast, in the present exemplary embodiment classification of human objects based on the main object information and the object correlation information does not require a lot of work and can be conducted with ease. Thus, a desired image can be extracted with ease simply by setting the object correlation information.

A third exemplary embodiment of the present invention is similar to the first exemplary embodiment, except for the method of setting the object correlation information. Thus, duplicate description of similar aspects is omitted. Compared to the second exemplary embodiment, the present exemplary embodiment further limits human objects having a correlation with a main person in setting the object correlation information. The following describes the present exemplary embodiment using the case of relationships illustrated in FIGS. 8A and 8B as an example.

As illustrated in FIG. 8A, the human object A belongs to the following affiliations: family of A, school of A, and company of A and B. Although the human object A (main object information: ID=1) is determined as the main person at the time of layout generation, appropriate images differ depending on the purpose of layout generation and viewers. For example, when a layout image for a grandmother of A is generated, "family of A affiliation 3501" is considered to be appropriate as the object correlation information. Therefore, "family of A affiliation 3501" is set as the object correlation information. When a layout image for use in an in-house magazine of the company of A is generated, since it is not appropriate to use a photograph including a human object who is irrelevant to the company, "company of A and B 3503" is considered to be appropriate as the object correlation information. Therefore, "company of A and B 3503" is set as the object correlation information.

Once the object correlation information is set as described above, images of the human objects of IDs=3, 4, and 5, who are members of the family of A, are extracted besides the main person A (ID=1) in the case of generating the layout image for the grandmother of A. In the case of generating the layout image for use in an in-house magazine of the company of A, photographs of the human objects of IDs=2, 9, and 10, who are members of the company of A and B, are extracted besides the main person A (ID=1).

As in the foregoing cases, images can be extracted more appropriately by limiting the affiliation to be used among the plurality of affiliations to which the main object belongs.

A user can set an affiliation to be used as the object correlation information. In the case of relationships illustrated in FIGS. 9A and 9B, images can be extracted more appropriately by selecting a human object from correlated human objects. For example, in the case of generating the layout image for the grandmother of A, "IDs=2, 3, 4, and 5" are considered to be appropriate as the object correlation information. Thus, "IDs=2, 3, 4, and 5" are set as the object correlation information. In the case of generating the layout image for use in an in-house magazine of the company of A, "IDs=2 and 9" are considered to be appropriate as the object correlation information. Thus, "IDs=2 and 9" are set as the object correlation information. A user can select a human object to be set as the object correlation information.

Compared with the second exemplary embodiment, the present exemplary embodiment can select a more appropriate human object as a human object having a correlation with the target human object (main person) to set the selected human object as the object correlation information.

Although the foregoing describes each exemplary embodiment of the present invention, the basic configuration of the present invention is not limited to the above exemplary embodiments.

In the above exemplary embodiments, a user intentionally determines the main object information. Alternatively, the main object information may be determined automatically from information that is not intentionally input by the user, such as image analysis information, image capturing information, and usage information. From the foregoing information, the main object information may be determined based on criteria. Examples of criteria include: the human object appears in the largest number of images; the human object appears in the largest total area; there are many close-ups of the face of the human object; the image captured time is largely dispersed (the human object appears evenly); the human object appears in images included in a registered event; and a large number of images of the human object are printed.

The main object information and the object correlation information for use in the layout generation may be determined from layout information. Examples of layout information include a layout theme, timing of layout generation, and a layout target period. The layout target period is to limit the timing at which images to be extracted were captured, such as a trip and an event. For example, when an application determines that the first birthday of a child of a user is coming soon and suggests the user to generate a layout with the theme of a growth record, "child" may be set as the main object information, and "family" may be set as the object correlation information. When the theme is set to "wedding ceremony," human objects named "groom" or "bride" may be set as the main objects.

Although the foregoing describes the cases of generating the layout based on the main object information and the object correlation information, the human object display screen illustrated in FIG. 4 may reflect the main object information and the object correlation information. When the main object information and the object correlation information are reflected on the display screen, only the main person and human objects having a close relation with the main person are displayed. This enables the user to see the relations with ease and confirm images classified for each human object.

The main object is not limited to a single object, and both the groom (ID=2) and the bride (ID=1) may be set as the main objects.

In the present exemplary embodiment, the affiliations are handled equally, but a plurality of affiliations may be given a priority order according to closeness to the main person. Further, although the human objects belonging to the same affiliation are handled equally in the present exemplary embodiment, each of the human objects in an affiliation may be given a priority order. For example, as to the priority order of the family of A, the priority order of the father of A (ID=4) and the mother of A (ID=3) may be set higher, while the priority order of the aunt of A (ID=5) may be set lower. When a priority order is given to the affiliations or to the human objects, a weight may be given according to the priority order. As described above, when the priority order or the weight is given, the priority order or the weight may be taken into consideration at the time of image extraction or at the time of image layout. For example, images of a human object given a high priority order or weight may be extracted more than other images at the time of image extraction. Further, images of a human object with a high priority order or weight may be laid out near the center or in a slot that is large and eye-catching at the time of image layout.

In the foregoing exemplary embodiment, a layout image is obtained by laying out a plurality of images on a layout template including a plurality of image layout frames. However, the layout template is not limited to that used in the exemplary embodiment. For example, the layout template may be a layout template in which image layout reference points are provided on a layout surface. The image layout reference points may be provided on the layout surface, and images may be laid out on the layout surface such that image layout points and each image partly correspond, e.g., image layout points and image reference points provided to each image are associated. In the above exemplary embodiment, an appropriate layout template is determined according to the layout theme. However, the present invention is not limited to the exemplary embodiment. For example, a user may determine a layout template. In this case, the layout generation unit may automatically generate a layout image by laying out a plurality of images extracted by the image extraction unit on the layout template determined by the user.

Although the above exemplary embodiments are described using the case of using a human object as the object, the object is not limited to a human object. The recognition processing of a pet such as a dog and a cat may be executed to recognize the pet so that the pet can be set as an object. The recognition processing may be executed to recognize a shape such as edge detection to recognize a building and a small article so that the building and the small article can be set as an object. If registration as an object is successful, the object correlation information can also be set. For example, when a dog that is a pet of a main person is set as the object correlation information, images including the main object together with the dog that is a pet can be extracted.

According to the exemplary embodiment of the present invention, a layout image in which a desired object is laid out as appropriate can be output with ease. The present exemplary embodiment can output a layout image appropriate for the purpose of use of the user so that the user can obtain a highly satisfactory suitable layout image.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)®), a flash memory device, a memory card, and the like. In addition, the entire processing is not necessarily realized by software, and a part of the processing or the entire processing may be realized by hardware.

While the present invention has been described with reference to exemplary embodiments, it is to be understood that the invention is not limited to the disclosed exemplary embodiments. The scope of the following claims is to be accorded the broadest interpretation so as to encompass such all modifications and equivalent structures and functions.

What is claimed is:

1. An image processing apparatus, comprising:
   at least one processor coupled to at least one memory, the at least one processor configured to perform operations comprising:
   acquiring a plurality of images;
   executing an analyzing process including recognizing objects included in the images;
   causing a display to display a screen including a setting section; and
   executing a layout process for generating a layout image based on the analyzing process and a user's input on the setting section,
   wherein a first face image of a first object and a second face image of a second object are displayed on the setting section, the first object and the second object having been recognized in the analyzing process, so that a user is able to set, on the setting section, a first priority in the layout process to the first object and able to set a second priority lower than the first priority in the layout process to the second object, while the first face image and the second face image are displayed on the setting section, and
   wherein the layout process is executed based on a result of setting the first priority and the second priority on the setting section.

2. The image processing apparatus according to claim 1, wherein, on the setting section, the first priority related to adopting an image in the layout process is able to be set to the first object and the second priority related to adopting an image in the layout process is able to be set to the second object, whereby an image including the first object and an image including the second object are preferentially adopted in the layout process.

3. The image processing apparatus according to claim 1, wherein an image including the first object and an image including the second object are preferentially adopted in the layout process so that a larger number of images including the first object and images including the second object are laid out in the layout process than an image including neither the first object nor the second object.

4. The image processing apparatus according to claim 1, wherein the image including the first object is adopted more preferentially than the image including the second object in the layout process.

5. The image processing apparatus according to claim 1, wherein the image including the first object is adopted more preferentially than the image including the second object in the layout process so that the image including the first object is laid out in a larger slot included in a template than the image including the second object in the layout process.

6. The image processing apparatus according to claim 1, wherein the image including the first object is adopted more preferentially than the image including the second object in the layout process so that a larger number of images including the first object is laid out than images including the second object in the layout process.

7. The image processing apparatus according to claim 1, wherein the first priority is able to be set to a plurality of objects.

8. The image processing apparatus according to claim 1, wherein an image feature quantity is acquired in the analyzing process.

9. The image processing apparatus according to claim 1, wherein the analyzing process includes scene analysis.

10. The image processing apparatus according to claim 1, wherein a template to be used in the layout process is selected according to a theme of a layout image to be generated.

11. The image processing apparatus according to claim 1, wherein a person is recognizable as an object in the analyzing process.

12. The image processing apparatus according to claim 11, wherein at least one of a dog and a cat is further recognizable as an object in the analyzing process.

13. The image processing apparatus according to claim 12, wherein preferential adoption of an image including the recognized person and the at least one of the recognized dog and the recognized cat in the layout process is settable on the setting section.

14. The image processing apparatus according to claim 1, wherein the layout process is executed automatically.

15. The image processing apparatus according to claim 1, wherein the layout image is to be converted to printable print data.

16. An image processing method, comprising:
   acquiring a plurality of images;
   executing an analyzing process including recognizing objects included in the images;

causing a display to display a screen including a setting section; and executing a layout process for generating a layout image based on the analyzing process and a user's input on the setting section, wherein a first face image of a first object and a second face image of a second object are displayed on the setting section, the first object and the second object having been recognized in the analyzing process, so that a user is able to set, on the setting section, a first priority in the layout process to the first object and able to set a second priority lower than the first priority in the layout process to the second object, while the first face image and the second face image are displayed on the setting section, and wherein the layout process is executed based on a result of setting the first priority and the second priority on the setting section.

17. The image processing method according to claim 16, wherein, on the setting section, the first priority related to adopting an image in the layout process is able to be set to the first object and the second priority related to adopting an image in the layout process is able to be set to the second object, whereby an image including the first object and an image including the second object are preferentially adopted in the layout process.

18. The image processing method according to claim 16, wherein an image including the first object and an image including the second object are preferentially adopted in the layout process so that a larger number of images including the first object and images including the second object are laid out in the layout process than an image including neither the first object nor the second object.

19. The image processing method according to claim 16, wherein the image including the first object is adopted more preferentially than the image including the second object in the layout process.

20. The image processing method according to claim 16, wherein the image including the first object is adopted more preferentially than the image including the second object in the layout process so that the image including the first object is laid out in a larger slot included in a template than the image including the second object in the layout process.

21. The image processing method according to claim 16, wherein the image including the first object is adopted more preferentially than the image including the second object in the layout process so that a larger number of images including the first object is laid out than images including the second object in the layout process.

22. The image processing method according to claim 16, wherein the first priority is able to be set to a plurality of objects.

23. The image processing method according to claim 16, wherein an image feature quantity is acquired in the analyzing process.

24. The image processing method according to claim 16, wherein the analyzing process includes scene analysis.

25. The image processing method according to claim 16, wherein a template to be used in the layout process is selected according to a theme of a layout image to be generated.

26. The image processing method according to claim 16, wherein a person is recognizable as an object in the analyzing process.

27. The image processing method according to claim 16, wherein at least one of a dog and a cat is further recognizable as an object in the analyzing process.

28. The image processing method according to claim 16, wherein preferential adoption of an image including the recognized person and the at least one of the recognized dog and the recognized cat in the layout process is settable on the setting section.

29. The image processing method according to claim 16, wherein the layout process is executed automatically.

30. The image processing method according to claim 16, wherein the layout image is to be converted to printable print data.

* * * * *